United States Patent
Juels (10) Patent No.: US 10,367,642 B1
(45) Date of Patent: Jul. 30, 2019

(54) CRYPTOGRAPHIC DEVICE CONFIGURED TO TRANSMIT MESSAGES OVER AN AUXILIARY CHANNEL EMBEDDED IN PASSCODES

(71) Applicant: EMC Corporation, Hopkinton, MA (US)

(72) Inventor: Ari Juels, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 609 days.

(21) Appl. No.: 13/711,877

(22) Filed: Dec. 12, 2012

(51) Int. Cl.
G06F 21/00 (2013.01)
H04L 9/32 (2006.01)
G06F 11/30 (2006.01)

(52) U.S. Cl.
CPC .................................. H04L 9/3226 (2013.01)

(58) Field of Classification Search
CPC .............................. G06F 21/34; H04L 63/0838
USPC ......................................................... 713/189
See application file for complete search history.

(56) References Cited

U.S. PATENT DOCUMENTS

| | | | |
|---|---|---|---|
| 6,904,526 B1 * | 6/2005 | Hongwei | G06F 21/31 713/172 |
| 6,993,666 B1 * | 1/2006 | Hokkanen | G06F 21/34 713/155 |
| 7,734,779 B1 * | 6/2010 | Piccionelli | H04L 63/083 709/217 |
| 7,752,450 B1 * | 7/2010 | Palmer | G06F 21/31 713/183 |
| 8,312,519 B1 * | 11/2012 | Bailey | H04L 9/003 380/255 |
| 8,327,422 B1 * | 12/2012 | Friedman | G06F 21/44 713/168 |
| 8,572,684 B1 * | 10/2013 | Sama | H04L 63/0838 726/2 |
| 8,699,713 B1 * | 4/2014 | Rivest | H04L 63/068 380/277 |
| 8,752,148 B1 * | 6/2014 | Vipond | H04L 9/3234 713/168 |
| 8,799,655 B1 * | 8/2014 | Dotan | H04L 9/3228 380/270 |
| 8,984,609 B1 | 3/2015 | Juels et al. | |
| 2004/0172535 A1 * | 9/2004 | Jakobsson | G06Q 20/341 713/168 |

(Continued)

*Primary Examiner* — Gary S Gracia
(74) *Attorney, Agent, or Firm* — Ryan, Mason & Lewis, LLP (57) ABSTRACT

A first cryptographic device determines multiple sets of passcodes for possible release in association with a corresponding one of a plurality of epochs, and transmits a message to a second cryptographic device over an auxiliary channel embedded in one or more passcodes released by the first cryptographic device to the second cryptographic device. For example, the first cryptographic device can determine multiple sets of passcodes by precomputing and storing the multiple sets of passcodes, or by generating one or more data sets from which the multiple sets of passcodes can be computed. The first cryptographic device transmits the message over the auxiliary channel by selecting a particular one of the multiple sets of passcodes based on content of the message and releasing a passcode from the selected set. The first cryptographic device may comprise an authentication token and the second cryptographic device may comprise an authentication server.

20 Claims, 4 Drawing Sheets

(56) References Cited

U.S. PATENT DOCUMENTS

| | | | | |
|---|---|---|---|---|
| 2005/0182971 A1* | 8/2005 | Ong | ............ | G06F 21/33 726/19 |
| 2006/0083228 A1* | 4/2006 | Ong | ............ | G06F 21/34 370/389 |
| 2006/0168657 A1* | 7/2006 | Baentsch | ............ | H04L 29/06 726/21 |
| 2007/0008070 A1* | 1/2007 | Friedrich | ............ | G06F 21/35 340/10.1 |
| 2007/0016794 A1* | 1/2007 | Harrison | ............ | H04L 9/0656 713/182 |
| 2007/0220597 A1* | 9/2007 | Ishida | ............ | G06Q 20/12 726/8 |
| 2007/0279227 A1* | 12/2007 | Juels | ............ | H04L 63/0492 340/572.1 |
| 2008/0172713 A1* | 7/2008 | Kamendje | ............ | H04L 9/3271 726/1 |
| 2008/0249947 A1* | 10/2008 | Potter | ............ | G06F 21/31 705/67 |
| 2008/0263646 A1* | 10/2008 | Jerez | ............ | G06F 21/41 726/6 |
| 2008/0276098 A1* | 11/2008 | Florencio | ............ | G06F 21/46 713/183 |
| 2009/0064294 A1* | 3/2009 | Cook | ............ | G06F 21/34 726/6 |
| 2009/0097459 A1* | 4/2009 | Jendbro | ............ | H04L 63/0838 370/338 |
| 2009/0132836 A1* | 5/2009 | Mera | ............ | H04L 63/08 713/310 |
| 2009/0199278 A1* | 8/2009 | Song | ............ | H04L 63/083 726/6 |
| 2010/0046553 A1* | 2/2010 | Daigle | ............ | G06F 21/35 370/474 |
| 2010/0073126 A1* | 3/2010 | Morin | ............ | G06F 21/36 340/5.2 |
| 2010/0106644 A1* | 4/2010 | Annan | ............ | G06Q 20/108 705/42 |
| 2011/0258121 A1* | 10/2011 | Kauniskangas | ............ | G06Q 20/20 705/67 |
| 2011/0274273 A1* | 11/2011 | Fiske | ............ | G06F 21/32 380/46 |
| 2011/0302641 A1* | 12/2011 | Hald | ............ | G06F 21/43 726/7 |
| 2012/0047563 A1* | 2/2012 | Wheeler | ............ | G06F 21/335 726/6 |
| 2012/0066504 A1* | 3/2012 | Hird | ............ | G06F 21/31 713/183 |
| 2012/0233675 A1* | 9/2012 | Hird | ............ | H04L 63/0838 726/6 |
| 2012/0233684 A1* | 9/2012 | Denis | ............ | G06F 21/335 726/9 |

* cited by examiner

CRYPTOGRAPHIC DEVICE CONFIGURED TO TRANSMIT MESSAGES OVER AN AUXILIARY CHANNEL EMBEDDED IN PASSCODES

FIELD

The field relates generally to cryptography, and more particularly to authentication techniques implemented using cryptographic devices.

BACKGROUND

Cryptographic devices include, by way of example, one-time passcode (OTP) devices such as authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other known types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In authentication tokens of this type, the passcodes are wirelessly communicated to a computer or other element of an authentication system. These wired or wireless arrangements, also referred to herein as connected tokens, save the user the trouble of reading the passcode from the display and manually entering it into the computer.

The above arrangements may be viewed as examples of what are more generally referred to herein as hardware authentication tokens. However, authentication tokens can also be implemented in the form of software installed on a computer, mobile phone or other processing device. Like hardware authentication tokens, software authentication tokens can be implemented as time-synchronous, event-synchronous, or hybrid time-synchronous and event-synchronous tokens.

Hardware and software authentication tokens and other types of OTP devices are typically programmed with a random seed or other type of key that is also stored in a token record file. The record file is loaded into an authentication server, such that the server can create matching passcodes for the authentication token based on the key and the current time or current event count.

In order to protect authentication tokens against cloning attacks, the keys used by these tokens may be periodically refreshed using approaches such as drifting keys, in which a set of secret keys shared between an authentication token and an authentication server evolve randomly over time. Periodic refresh operations are applied to the set of keys, typically at the start of respective time periods. Such time periods are examples of what more generally referred to herein as "epochs."

Certain authentication tokens or other types of cryptographic devices are configured to store a number of pre-computed passcodes rather than to compute all passcodes on an as-needed basis (i.e., "on the fly"). Such an arrangement is particularly well suited for use in devices that have limited computational power but significant memory resources. Authentication tokens of this type are also referred to as stored-passcode authentication tokens and can be implemented using reduced computational resources relative to tokens that generate passcodes on the fly. However, a drawback of conventional stored-passcode authentication tokens is that such tokens are generally unable to support communication via side channels or other types of auxiliary channels. Such auxiliary channels are useful in supporting the above-noted drifting keys approach as well as other related security functions such as silent alarms.

SUMMARY

One or more illustrative embodiments of the present invention provide messaging functionality for stored-passcode authentication tokens and other types of cryptographic devices by using an auxiliary channel embedded in one or more passcodes.

In one embodiment, a first cryptographic device is configured to determine multiple sets of passcodes for possible release in association with a corresponding one of a plurality of epochs, and to transmit a message to a second cryptographic device over an auxiliary channel embedded in one or more passcodes released by the first cryptographic device to the second cryptographic device. The first cryptographic device is configured to transmit the message over the auxiliary channel by selecting a particular one of the multiple sets of passcodes based on content of the message and releasing a passcode from the selected set.

By way of example, the first cryptographic device can determine multiple sets of passcodes by precomputing and storing the multiple sets of passcodes, or by generating one or more data sets from which the multiple sets of passcodes can be computed.

The first cryptographic device may illustratively comprise an authentication token and the second cryptographic device may illustratively comprise an authentication server.

Although particularly well suited for use with stored-passcode authentication tokens, embodiments of the invention can be implemented using a wide variety of other types of cryptographic devices.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

The term "passcode" as used herein is intended to include authentication information such as OTPs, or more generally any other information that may be utilized for cryptographic authentication purposes. Although the illustrative embodiments will be described below primarily in the context of OTPs, it is to be appreciated that the invention is more broadly applicable to any other type of passcode.

The term "cryptographic device" as used herein is intended to be construed broadly, so as to encompass not only authentication tokens but also other types of devices that can transmit or receive messages over an auxiliary channel embedded in one or more passcodes in the manner disclosed herein. Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides messaging functionality for stored-passcode authentication tokens and other types of cryptographic devices by using an auxiliary channel embedded in one or more passcodes.

Figure 1:
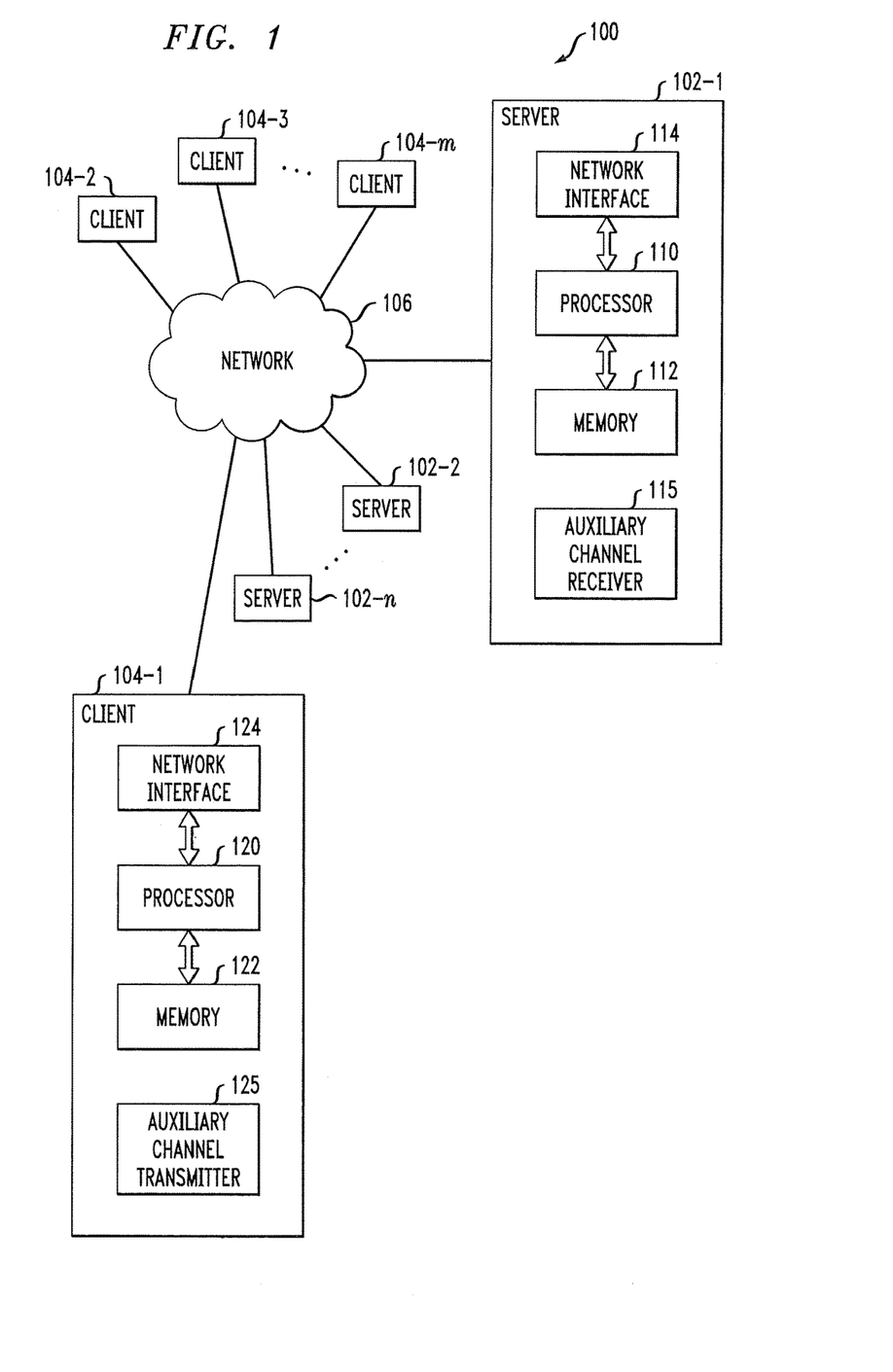
FIG. 1 is a block diagram of a communication system with auxiliary channel messaging functionality in an illustrative embodiment of the invention.

FIG. 1 shows a communication system 100 that incorporates auxiliary channel messaging functionality in an illustrative embodiment. The system 100 comprises a plurality of servers 102-1, 102-2, . . . 102-n that are configured to communicate with a plurality of clients 104-1, 104-2, . . . 104-m, over a network 106.

The servers 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The system 100 in the present embodiment implements one or more processes for auxiliary channel messaging. An example of such a process performed at least in part in conjunction with a given one of the clients 104 authenticating to one or more of the servers 102 will be described in conjunction with FIG. 3, but it is to be appreciated that numerous other types of processes may be used in other embodiments.

A given one of the servers 102-1 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the server 102-1 is network interface circuitry 114. The network interface circuitry 114 allows the server 102-1 to communicate over the network 106 with the other servers 102 and with the clients 104, and may comprise one or more conventional transceivers.

The server 102-1 further includes an auxiliary channel receiver 115. This receiver may be implemented at least in part in the form of software that is stored in memory 112 and executed by processor 110.

The other servers 102 of the system 100 are assumed to be configured in a manner similar to that shown for server 102-1 in the figure.

A given one of the clients 104-1 in the present embodiment comprises a processor 120 coupled to a memory 122. The processor 120, like processor 110 in server 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the client 104-1 is network interface circuitry 124. The network interface circuitry 124 allows the client 104-1 to communicate over the network 106 with the servers 102 and with the other clients 104, and may comprise one or more conventional transceivers.

The client 104-1 further includes an auxiliary channel transmitter 125. This transmitter may be implemented at least in part in the form of software that is stored in memory 122 and executed by processor 120.

The other clients 104 of the system 100 are assumed to be configured in a manner similar to that shown for client 104-1 in the figure.

The servers 102 and clients 104 may include additional components not specifically illustrated in this figure but of a type commonly used in implementing authentication processes, as will be appreciated by those skilled in the art.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The communication system 100 as shown in FIG. 1 is configured to allow a first cryptographic device, such as a given one of the clients 104, to authenticate itself to at least a second cryptographic device, such as one or more of the servers 102, using a secret value associated with the first cryptographic device. The communication system 100 and other similar systems herein are therefore also referred to as authentication systems. The secret value may comprise a seed or other key stored in the first cryptographic device that is refreshed in each of a plurality of epochs. The epochs may comprise, for example, respective time intervals. However, the term "epoch" as used herein is intended to be broadly construed so as to also encompass event-based epochs of various types.

In conjunction with the above-noted authentication, or in other situations, the first cryptographic device can securely communicate additional information in the form of messages to the second cryptographic device over an auxiliary channel embedded in one or more passcodes. More particularly, in the FIG. 1 embodiment, client 104-1 uses its auxiliary channel transmitter 125 to communicate messages securely to the auxiliary channel receiver 115, as will be described in greater detail below.

It is to be appreciated that the particular set of elements shown in FIG. 1 for providing auxiliary channel messaging is presented by way of example, and in other embodiments additional or alternative elements may be used. Thus, another embodiment may include additional networks and additional sets of clients or servers.

As mentioned previously, various elements of system 100 such as clients, servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

As noted above, in one or more of illustrative embodiments, the first cryptographic device and the second cryptographic device may comprise an authentication token and an authentication server, respectively.

Figure 2:
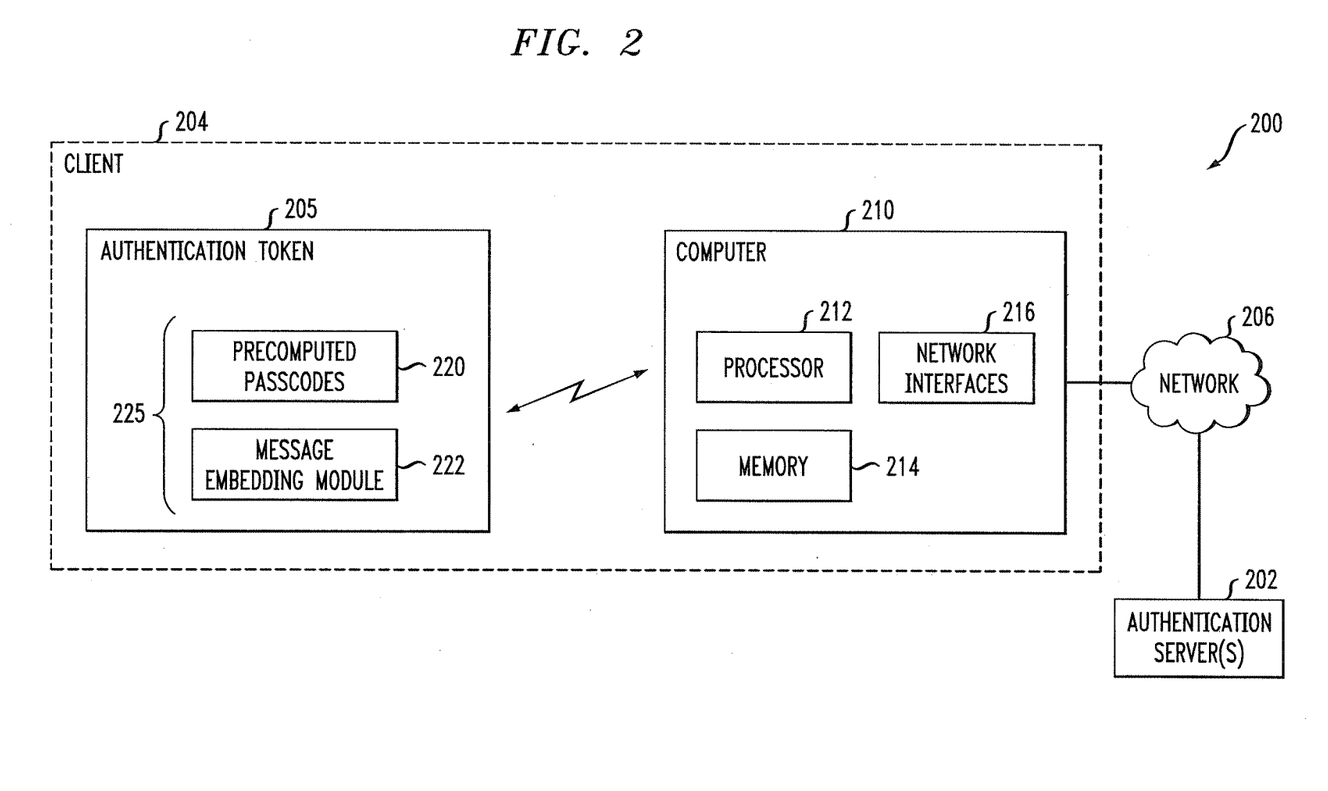
FIG. 2 shows one possible implementation of the FIG. 1 system including an authentication token and an authentication server in an illustrative embodiment of the invention.

FIG. 2 shows an example of an authentication system 200 corresponding generally to an implementation of communication system 100 in which one or more authentication servers 202 authenticate a client 204 that comprises an authentication token 205. Information from the authentication token 205 is sent to a given authentication server 202 via network 206 and a host device that illustratively comprises a computer 210. As indicated previously, the term "cryptographic device" as used herein is intended to be broadly construed so as to encompass, for example, authentication token 205 alone or in combination with at least a portion of the computer 210. In other embodiments, such as those involving use of software tokens, the first cryptographic device may comprise only computer 210, or another type of processing device, such as a mobile telephone.

The authentication token 205 is configured to generate OTPs or other passcodes using the techniques disclosed herein. Such passcodes may be presented to a user via a display of the token, such that the user can manually enter a given passcode into a user interface of the computer 210. Alternatively, a given passcode may be communicated directly from the authentication token 205 via a wired or wireless connection between the token and the computer 210. By way of example, the authentication token may be configured to communicate with the computer 210 via a wired connection such as a USB interface, or via a wireless connection such as a Bluetooth or IEEE 802.11 connection.

The authentication token 205 may be, for example, a time-synchronous authentication token, an event-synchronous authentication token, a challenge-response token, a hash-chain token, or a hybrid token that incorporates multiple such capabilities, such as a hybrid time-synchronous and event-synchronous token. A given authentication token may be a connected token or a disconnected token, or one capable of operating in both connected and disconnected modes. The disclosed techniques can be adapted in a straightforward manner for use with other types of authentication devices, or more generally cryptographic devices.

As a more particular example, the authentication token 205 may comprise a time-synchronous authentication token such as the above-noted RSA SecurID® user authentication token, suitably modified as disclosed herein.

The authentication token 205 in the present embodiment further comprises an auxiliary channel transmitter 225 that utilizes one or more sets of precomputed passcodes 220 and a message embedding module 222 to transmit messages to a corresponding auxiliary channel receiver in a given authentication server 202.

Although the auxiliary channel transmitter 225 in this embodiment is implemented in authentication token 205, in other embodiments the auxiliary channel transmitter may be implemented at least in part in another system element, such as in the computer 210. As noted above, the token 205 and computer 210 may be collectively viewed as an example of a "cryptographic device" as that term is broadly used herein.

The host device illustratively implemented as computer 210 in the FIG. 2 embodiment may comprise a desktop or portable personal computer, mobile telephone, personal digital assistant (PDA), wireless email device, workstation, kiosk, television set-top box, game console, or any other processing device that provides an interface between authentication token 205 and a given authentication server 202.

As shown in the figure, the computer 210 generally comprises a processor 212, a memory 214, and one or more network interfaces 216 which allow the device to communicate with a given authentication server 202 over the network 206.

It should also be noted that a given authentication token need not take the form of a stand-alone hardware token. For example, such a device may be incorporated into another processing device, such as a computer, mobile telephone, etc. In one such implementation, the host device and the authentication token may be combined into a single processing device that communicates with the authentication server.

In the system 200, the authentication server 202 is configured as a back-end authentication server, in that it communicates with computer 210 over a network, but other types of authentication servers may be used.

A wide variety of authentication processes may be implemented using an authentication token, a host device and a set of one or more authentication servers arranged as shown in FIG. 2. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

It is to be appreciated that a given embodiment of the system 200 may include multiple instances of an authentication token, a host device and a set of one or more authentication servers, and possibly other system components, although only single instances of illustrative examples of such components are shown in the simplified system diagram of FIG. 2 for clarity of illustration. Also, as indicated previously, other embodiments may combine certain system elements, such as an authentication token and a host device. It is also possible to eliminate, modify or replace other system elements. For example, authentication token 205 may communicate directly with authentication server 202, rather than via other elements such as computer 210 and network 206.

The operation of the systems 100 and 200 will now be described in greater detail with reference to the flow diagram of FIG. 3, which illustrates a set of operations performed primarily by a given client 104-1 or 204 in transmitting messages securely over an auxiliary channel to a given server 102-1 or 202 in an illustrative embodiment. The given client 104-1 or 204 is referred to in the context of the FIG. 3 flow diagram as a first cryptographic device and the given server 102-1 or 202 is referred to as a second cryptographic device.

The process as shown includes steps 300, 302 and 304. Steps 300 and 302 are assumed to be performed by the given client 104-1 or 204, and step 304 is assumed to be performed in part by the given client 104-1 or 204 and in part by the given server 102-1 or 202. It is to be appreciated that in other embodiments one or more such steps may be implemented at least in part by other system elements.

In step 300, a first cryptographic device illustratively comprising a given client 104-1 or 204 determines multiple sets of passcodes for possible release in association with a current one of a plurality of epochs. For example, the multiple sets of passcodes may be determined by precomputing and storing the multiple sets of passcodes in the first cryptographic device, using a stored-passcode arrangement. As another example, the multiple sets of passcodes may be determined by generating one or more data sets from which the multiple sets of passcodes can be computed as needed. Other techniques may be used to determine multiple sets of passcodes in other embodiments. Also, it is possible that a given such set of passcodes may contain only a single passcode.

The multiple sets of passcodes determined in step 300 may comprise at least a portion of the precomputed passcodes 220 of the auxiliary channel transmitter 225 illustrated FIG. 2.

In step 302, the first cryptographic device transmits at least a portion of a message to a second cryptographic device illustratively comprising a given server 102-1 or 202 over an auxiliary channel embedded in one or more passcodes. In the present embodiment, this involves selecting a particular one of the multiple sets of passcodes based on content of the message, and releasing a passcode from the selected set in association with the current epoch. After release of a passcode in this manner for the current epoch, the multiple valid passcodes for that epoch are erased or reordered.

For example, in a given current epoch t, a message $m_t$ is transmitted over the auxiliary channel by conditioning selection of the particular one of the multiple sets of passcodes on message $m_t$ and releasing a particular passcode $P_t$ from the selected set of passcodes in association with epoch t. In this example, a given one of the multiple sets of passcodes is of the form $\{P_1, \ldots, P_n\}$, where $P_i = f_K(t)$ for $1 \leq i \leq n$, t denotes a current one of the plurality of epochs, n is a security parameter denoting the number of passcodes in the given set, and $f_K(t)$ is a function that utilizes a secret key K of the first cryptographic device. Thus, for the given current epoch t, the first cryptographic device contains multiple valid passcodes, one from each of the multiple sets, and the message $m_t$ is transmitted over the auxiliary channel by conditioning the selection of emitted passcode $P_t$ on $m_t$.

As a more particular example, a binary message may be transmitted over a one-bit auxiliary channel in the following manner. Assume that the message comprises a one-bit binary message $m_t \in \{0,1\}$ and the multiple sets of passcodes comprise two sets of passcodes $\{P_1^{(0)}, \ldots, P_n^{(0)}\}$ and $\{P_1^{(1)}, \ldots, P_n^{(1)}\}$. In such an arrangement, transmitting the message $m_t$ comprises releasing passcode $P_t \leftarrow P_t^{(m_t)}$ and then erasing $P_t^{(0)}$ and $P_t^{(1)}$.

The operations associated with step 302 may be performed at least in part by message embedding module 222 of the auxiliary channel transmitter 225 illustrated FIG. 2. The embedded message itself may be viewed as an auxiliary channel as the latter term is broadly utilized herein.

The message transmitted over the auxiliary channel can comprise any type of information that it is desirable to communicate in a secure manner from the first cryptographic device to the second cryptographic device. For example, the message may comprise security-related side information associated with an authentication process carried out between the first and second cryptographic devices. Such security-related side information can include information designed to detect device tampering or cloning, information relating to device conditions such as battery status, or other important information. Other examples include information utilized to support drifting keys or silent alarms.

Embodiments of the invention are therefore not limited in terms of the content and construction of the message or messages transmitted over the auxiliary channel, and the term "message" is therefore intended to be broadly construed herein. For example, it is possible that a given message may comprise a portion of a larger message that is multiplexed into the auxiliary channel or otherwise separated into portions for transmission over the auxiliary channel A portion of a given message should therefore also be understood to constitute a message as that term is used herein.

In step 304, the first and second cryptographic devices advance to the next epoch. As mentioned previously, the epochs may comprise respective time intervals or other time-based epochs, or event-based epochs. Other types of epochs, including hybrid time-based and event-based epochs, may be used. The term "epoch" as used herein is therefore intended to be broadly construed.

After advancing to the next epoch, the first cryptographic device repeats steps 300 and 302 in order to transmit additional information to the second cryptographic device. This message transmission functionality can therefore be performed continuously or intermittently over multiple epochs, as needed in order convey additional information other than passcodes from the first cryptographic device to the second cryptographic device over the auxiliary channel.

Figure 3:
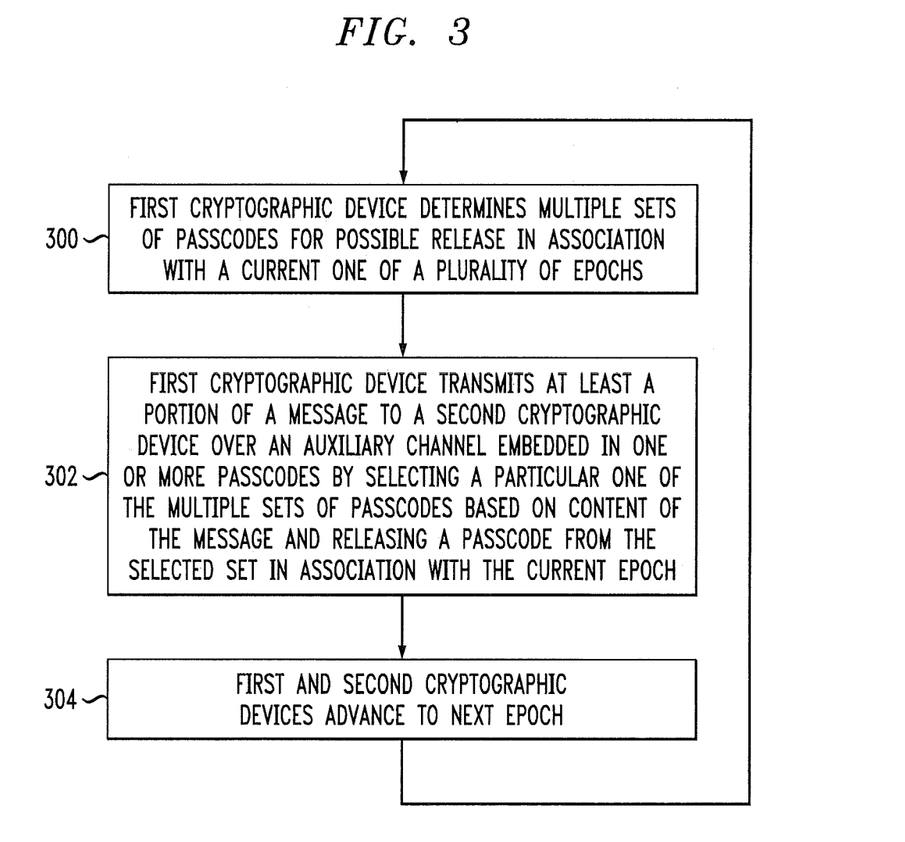
FIG. 3 is a flow diagram of an auxiliary channel message transmission process implemented in the system of FIG. 1 or FIG. 2.

The particular processing operations and other system functionality described in conjunction with the flow diagram of FIG. 3 are presented by way of illustrative example only, and should not be construed as limiting the scope of the invention in any way. Alternative embodiments can use other types of processing operations for auxiliary channel message transmission. For example, the ordering of the process steps may be varied in other embodiments, or certain steps may be performed concurrently with one another rather than serially.

The auxiliary channel described in conjunction with FIG. 3 is configured to implement a number of desirable security properties, including forward security, integrity and channel efficiency. These properties are described in the context of the present embodiment in further detail below.

Forward security is the property that compromise of the first cryptographic device does not reveal messages transmitted for previous epochs. This is true even for a strong attacker capable of harvesting passcodes prior to compromising the device. To achieve forward security, passcodes are erased or reordered as their validity expires. In the one-bit auxiliary channel example given above, a compromise of the first cryptographic device at epoch t allowing observation of a released passcode for a previous epoch s<t does not allow determination of a corresponding message $m_s$. This is because both $P_s^{(0)}$ and $P_s^{(1)}$ have been erased or reordered before the compromise.

Integrity is the property that modification of auxiliary channel transmissions by a "man-in-the-middle" attacker is detectable by the second cryptographic device. Such modification will with high probability result in an invalid passcode. Thus, in the one-bit auxiliary channel example, an attacker is unable to alter message $m_t$ in an intercepted passcode $P_t = P_t^{(m_t)}$ without knowing $P_t^{(1-m_t)}$.

Channel efficiency is the property that any degradation in passcode security due to embedding of the auxiliary channel is minimal in an information-theoretic sense. In the one-bit auxiliary channel example, the strength of $P_t$ is reduced by exactly one bit, since there are now two valid passcodes for epoch t with the auxiliary channel, instead of just one valid passcode for epoch t without the auxiliary channel. However, the bandwidth of the auxiliary channel is also one bit. Thus, the reduction in passcode security for this example is exactly equal to the bandwidth of the embedded auxiliary channel, such that the channel efficiency property is satisfied.

It should be noted that, although the above-described desirable properties of forward security, integrity and channel efficiency are present in certain embodiments of the invention, other embodiments may have different sets of security properties.

An exemplary auxiliary channel construction for certain embodiments of the invention will now be described in greater detail. This construction is an example of an arrangement in which multiple sets of passcodes are determined by generating one or more data sets from which the multiple sets of passcodes can be computed as needed. More particularly, in one or more embodiments utilizing the construction to be described, a set of data elements is generated using a secret key of the first cryptographic device, a subset of data elements is selected from the set of data elements, particular data elements in the subset of data elements are identified based on the message, and a passcode to be released in association with a current one of the epochs is determined as a function of the particular data elements.

Let $t \in Z$ denote the current epoch.

Let $m_t \in M$ be the message to be transmitted over the auxiliary channel using passcode $P_t$ where M is a message space.

Let $D = \{d_0, \ldots, d_n\}$ denote a set of data elements stored in the first cryptographic device, where $d_i \in R$ for a space of data elements R.

One embodiment of the first cryptographic device is then configured to implement the auxiliary channel using the following four functions, with security parameters n, l and k:

1. Data set generation function: A data set generation function $g(n)(\sigma)$ generates set $D = \{d_0, \ldots, d_n\}$ of n distinct l-bit data elements pseudorandomly from a seed $\sigma$ of the first cryptographic device.

2. Subset selection function: A subset selection function $s(t) \rightarrow S_t \in Z_n^k$ determines the indices of a subset of k data elements from D from which particular data elements will be chosen for passcode construction. The selected subset $S_t$ may or may not be passed as explicit input to the next two functions.

3. Combiner function: A combiner function $c(t, m_t) \rightarrow P_t$ computes the passcode for index t by combining particular data elements corresponding to positions in $S_t$ based on the message $m_t$. Thus, the combiner function identifies particular ones of the k data elements in subset $S_t$ using $m_t$ and then combines these identified data elements to compute the passcode $P_t$ for release in epoch t. For example, the passcode $P_t$ for release in epoch t may be computed as an exclusive-or (XOR) or other function of the particular selected ones of the k data elements. An optional security parameter j may be used to specify the number of combined data elements.

4. Concealer function: A concealer function $e(t) \rightarrow R^k$ computes a new set of data elements to replace the particular data elements corresponding to positions in $S_t$ that were utilized by the combiner function to determine $P_t$. As a simple example, e(t) may simply erase these particular data elements in $S_t$ by replacing them with predetermined binary strings, such as strings of "0" bits.

An auxiliary channel implemented using the above-described functions provides a high bandwidth while keeping $S_t$ small. An example of this embodiment for transmission of a $m_t \in \{0, 1, \ldots, 9\}$ will now be described.

In this example, the data set generation function $g(n)(\sigma)$ outputs the set D comprising n distinct l-bit data elements. The subset selection function s(t) selects a subset of five sequential data elements $S_t = \{d_{5t}, d_{5t+1}, \ldots, d_{5t+4}\} \in M = \{0, 1\}^l$. The combiner function $c(t, m_t) \rightarrow P_t$ selects three data elements from the subset $S_t$ and computes $P_t$ as the XOR of these three data elements.

The combiner function $c(t, m_t) \rightarrow P_t$ in selecting the three data elements from $S_t$ chooses from among $\binom{5}{3} = 10$ distinct combinations of three elements selected from five data elements. Each of these distinct combinations corresponds to a different one of the ten possible values of the message $m_t$. Each resulting passcode $P_t$ will be unique with high probability if M is large enough. Alternatively, the combinations may be rendered unique through appropriate construction of $\{d_{5t}, d_{5t+1}, \ldots, d_{5t+4}\}$.

The second cryptographic device receiving the released passcode $P_t$ may try all ten possible combinations of data elements in $S_t$ to determine the three particular data elements that were combined to compute $P_t$ and thereby recover $m_t$.

As an enhancement to facilitate this message recovery process, data elements can be assigned tags that are invariant under the combiner function $c(t, m_t) \rightarrow P_t$. In the context of the present example, tags selected from an exemplary predetermined tag set {'00001', '00010', '00100', '01000', '10000'} can be appended in a distinct, pseudorandom order to data elements in subset $S_t$. When combined together, the tags corresponding to the data elements selected by the combiner function yield a bitstring of weight three from which the component data elements can be read out by the second cryptographic device with knowledge of the appending order.

Other variants are also possible. For example, if epoch t represents an authentication challenge, the data element selection can be conditioned on a history of incoming challenges. Also, the size of the subset $S_t$ may vary from epoch to epoch.

It is to be appreciated that auxiliary channel messaging functionality such as that described in conjunction with the flow diagram of FIG. 3 and the associated examples above can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1-3 can provide a number of significant advantages relative to conventional practice. For example, these embodiments allow a stored-passcode authentication token or other type of cryptographic device to communicate in a secure manner through an auxiliary channel embedded in passcodes, while providing desirable properties such as forward security, integrity and channel efficiency.

Auxiliary channel messaging techniques of the type described above in conjunction with FIGS. 1-3 may be implemented in a wide variety of different applications. Two additional exemplary communication system applications that may incorporate auxiliary channel messaging functionality will now be described with reference to FIGS. 4 and 5.

Figure 4:
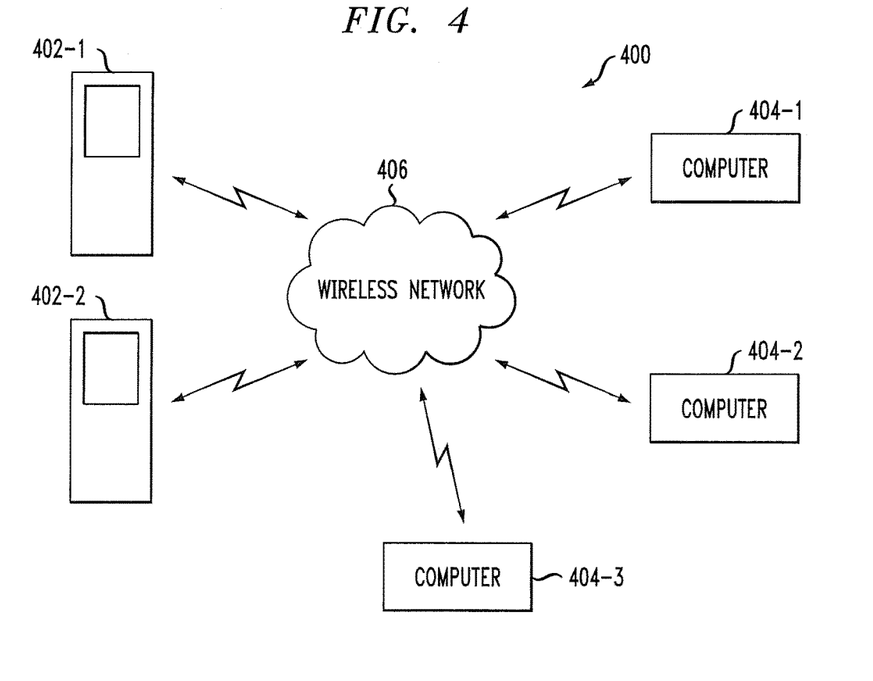
FIGS. 4 and 5 show embodiments of other communication systems that incorporate auxiliary channel messaging functionality of the type illustrated in FIG. 3.

Referring initially to FIG. 4, a communication system 400 comprises a plurality of mobile telephones 402-1 and 402-2 and computers 404-1, 404-2 and 404-3, configured to communicate with one another over a network 406.

Any two or more of the devices 402 and 404 may correspond to respective first and second cryptographic devices configured to utilize an auxiliary channel embedded in one or more passcodes as previously described.

Figure 5:
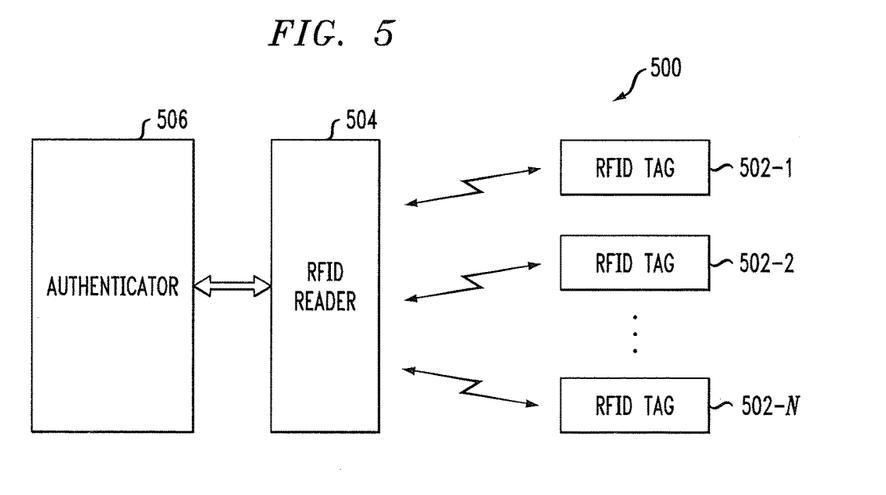

FIG. 5 shows another exemplary communication system 500 in an illustrative embodiment of the invention. In this embodiment, the system 500 is an RFID system comprising RFID tags 502-1, 502-2, . . . 502-N, a reader 504, and an authenticator 506. One or more of the RFID tags 502 may correspond to the first cryptographic device, and the reader 504, possibly in combination with the authenticator 506, may correspond to the second cryptographic device. The authenticator 506 may represent, for example, a back-end authentication server configured to authenticate secret values supplied to it by one or more of the RFID tags 502 via the reader 504. The system 500 may be configured such that one or more of the RFID tags 502 can each securely communicate messages to the reader 504 or authenticator 506 over an auxiliary channel embedded in one or more passcodes.

It is to be appreciated that the techniques disclosed herein can be implemented in numerous other applications.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from auxiliary channel messaging as disclosed herein. Also, the particular configuration of communication system and processing device elements shown in FIGS. 1, 2, 4 and 5, and the auxiliary channel messaging process shown in FIG. 3, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   determining multiple sets of passcodes in a first cryptographic device, the multiple sets comprising respective different valid passcodes for possible release in association with a given one of a plurality of epochs;
   determining a message to communicate from the first cryptographic device to a second cryptographic device in conjunction with the given epoch;
   selecting a particular one of the multiple sets of passcodes based on content of said message;
   releasing a passcode associated with the given epoch from the selected set; and
   communicating said message over an auxiliary channel embedded in the released passcode, wherein communicating said message comprises transmitting the released passcode from the first cryptographic device to the second cryptographic device.

2. The method of claim 1 wherein determining multiple sets of passcodes comprises precomputing and storing the multiple sets of passcodes in the first cryptographic device.

3. The method of claim 1 wherein determining multiple sets of passcodes comprises generating one or more data sets from which the multiple sets of passcodes can be computed.

4. The method of claim 1 wherein for the given epoch, denoted as epoch t, a message $m_t$ is communicated over the auxiliary channel by conditioning selection of the particular one of the multiple sets of passcodes on message $m_t$ and releasing a particular passcode $P_t$ from the selected set of passcodes in association with epoch t.

5. The method of claim 4 wherein a given one of the multiple sets of passcodes is of the form $\{P_1, \ldots, P_n\}$, where $P_t = f_\kappa(t)$ for $1 \leq t \leq n$, t denotes a current one of the plurality of epochs, n denotes the number of passcodes in the given set, and $f_\kappa(t)$ is a function that utilizes a secret key $\kappa$ of the first cryptographic device, and further wherein the first cryptographic device releases passcode $P_t$ in association with epoch t.

6. The method of claim 5 wherein the message comprises a one-bit binary message $m_t \in \{0,1\}$ and the multiple sets of passcodes comprise two sets of passcodes $\{P_1^{(0)}, \ldots, P_n^{(0)}\}$ and $\{P_1^{(1)}, \ldots, P_n^{(1)}\}$ and further wherein for epoch t communicating the message $m_t$ comprises releasing passcode $P_t \leftarrow P_t^{(m_t)}$ and then erasing $P_t^{(0)}$ and $P_t^{(1)}$.

7. The method of claim 5 wherein compromise of the first cryptographic device allowing observation of a released passcode for epoch s<t does not allow determination of a corresponding message $m_s$.

8. The method of claim 5 wherein an attacker is unable to alter message $m_t$ in an intercepted passcode $P_t = P_t^{(m_t)}$ without knowing $P_t^{(1-m_t)}$.

9. The method of claim 3 wherein the determining multiple sets of passcodes, determining the message to communicate and selecting comprise:
   generating a set of data elements using a secret key of the first cryptographic device;
   selecting a subset of data elements from the set of data elements;
   identifying particular data elements in the subset of data elements based on the message; and determining a passcode to be released in association with a current one of the epochs as a function of the particular data elements.

10. The method of claim 9 wherein generating the set of data elements comprises generating a data set $D=\{d_0, \ldots, d_n\}$ of l-bit data items pseudorandomly from a seed $\sigma$ where l and n denote security parameters.

11. The method of claim 10 wherein selecting a subset of data elements from the set of data elements comprises identifying a subset $S_t$ of k data elements for current epoch t from data set D.

12. The method of claim 11 wherein identifying particular data elements in the subset of data elements based on the message comprises identifying selected ones of the k data elements in $S_t$ based on a message $m_t$.

13. The method of claim 12 wherein determining the passcode to be released in association with current epoch t comprises computing the passcode as an XOR function of the particular selected ones of the k data elements.

14. The method of claim 9 further comprising replacing the particular data elements with new data elements.

15. The method of claim 14 wherein replacing the particular data elements with new data elements comprises replacing the particular data elements with predetermined binary strings.

16. A computer program product comprising a processor-readable storage medium having embodied therein one or more software programs, wherein the one or more software programs when executed by a processor of the first cryptographic device cause the method of claim 1 to be performed.

17. An apparatus comprising:
a first cryptographic device comprising a processor coupled to a memory;
the first cryptographic device being configured:
to determine multiple sets of passcodes, the multiple sets comprising respective different valid passcodes for possible release in association with a given one of a plurality of epochs,
to determine a message to communicate from the first cryptographic device to a second cryptographic device in conjunction with the given epoch,
to select a particular one of the multiple sets of passcodes based on content of said message,
to release a passcode associated with the given epoch from the selected set, and
to communicate said message over an auxiliary channel embedded in the released passcode, wherein the first cryptographic device is configured to communicate said message by transmitting the released passcode from the first cryptographic device to the second cryptographic device.

18. The apparatus of claim 17 wherein the first cryptographic device comprises an authentication token and the second cryptographic device comprises an authentication server.

19. The apparatus of claim 18 wherein the authentication token comprises one of a hardware authentication token and a software authentication token.

20. A communication system comprising:
a plurality of processing devices configured to communicate over one or more networks;
first and second ones of the processing devices comprising respective first and second cryptographic devices;
the first cryptographic device being configured:
to determine multiple sets of passcodes, the multiple sets comprising respective different valid passcodes for possible release in association with a given one of a plurality of epochs,
to determine a message to communicate from the first cryptographic device to the second cryptographic device in conjunction with the given epoch,
to select a particular one of the multiple sets of passcodes based on content of said message,
to release a passcode associated with the given epoch from the selected set, and
to communicate said message over an auxiliary channel embedded in the released passcode, wherein the first cryptographic device is configured to communicate said message by transmitting the released passcode from the first cryptographic device to the second cryptographic device.

* * * * *